(12) United States Patent
Ye et al.

(10) Patent No.: US 6,707,599 B1
(45) Date of Patent: Mar. 16, 2004

(54) OPTICAL NETWORK EQUIPMENT WITH TRIGGERED DATA STORAGE

(75) Inventors: Jun Ye, Palo Alto, CA (US); Yen-Wen Lu, Los Altos, CA (US); Manman Ren, Sunnyvale, CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/928,369

(22) Filed: Aug. 14, 2001

Related U.S. Application Data (60) Provisional application No. 60/300,058, filed on Jun. 25, 2001.

(51) Int. Cl.[7] ............................................. H04B 10/12
(52) U.S. Cl. ............................ 359/341.41; 359/341.4; 359/341.42; 359/177; 359/337.11
(58) Field of Search ...................... 359/341.4, 341.41, 359/341.42, 177, 337.11

(56) References Cited

U.S. PATENT DOCUMENTS

| | | | |
|---|---|---|---|
| 4,918,396 A | 4/1990 | Halemane et al. ........... 330/4.3 |
| 5,321,541 A | 6/1994 | Cohen ......................... 359/127 |
| 5,513,029 A | 4/1996 | Roberts ....................... 359/177 |
| 5,654,816 A | 8/1997 | Fishman ...................... 359/177 |
| 5,655,068 A | 8/1997 | Opoczynski ............ 395/182.02 |

OTHER PUBLICATIONS

Nortel Networks Datasheet "MGM Multiwavelength Gain Module" (Nov. 3, 2000).

Primary Examiner—Thomas G. Black
Assistant Examiner—Stephen Cunningham
(74) Attorney, Agent, or Firm—G. Victor Treyz (57) ABSTRACT

Optical network equipment is provided. The optical network equipment may include optical amplifiers. Control units may be used to control components in the equipment such as gain stage pump lasers. Sensor data may be obtained from sensors in the equipment. The control units may store the sensor data and control data and other information on the operation of the equipment. The stored data may be used in troubleshooting, network maintenance, and set up procedures. Data may be saved when a data storage command is received by the equipment or may be saved when data storage trigger criteria are satisfied. A user may be provided with the ability to customize the trigger criteria and the data storage parameters.

7 Claims, 8 Drawing Sheets

OPTICAL NETWORK EQUIPMENT WITH TRIGGERED DATA STORAGE

This application claims the benefit of U.S. provisional patent application No. 60/300,058, filed Jun. 25, 2001.

BACKGROUND OF THE INVENTION

The present invention relates to fiber-optic communications networks, and more particularly, to optical network equipment such as optical amplifiers in which data may be stored for review and analysis.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. For example, optical amplifiers may be used to amplify optical data signals that have been attenuated by fiber spans and components in fiber-optic links. A typical amplifier may include erbium-doped fiber coils that are pumped with diode lasers. Raman amplifiers may also be used. Distributed Raman amplifiers include Raman-pumped transmission fiber. Discrete Raman amplifiers include Raman-pumped coils of fiber.

When channels are added and dropped from a link, the input power to an amplifier may change suddenly. This may cause gain transients in the amplifier unless the pump power of the amplifier is adjusted. Even when the pump power is adjusted appropriately to suppress transients, there may be small residual transient effects.

It may be desirable to analyze the transient control performance of an amplifier or to perform other performance measurements. For example, during troubleshooting operations or routine maintenance it may be desirable to investigate the performance of an amplifier in response to a given input power transient. This typically requires the use of ancillary test equipment such as high-speed power monitors and oscilloscopes. Moreover, some amplifier parameters such as pump drive currents cannot be readily measured, because there is no straightforward way to access these signals with the test equipment.

It is an object of the present invention to provide a way in which to gather information on the operation of an optical amplifier or other equipment by saving operating data such as sensor data and control data during equipment operation.

SUMMARY OF THE INVENTION

This and other objects of the invention are accomplished in accordance with the present invention by providing optical network equipment such as optical amplifiers for use in fiber-optic communications links in fiber-optic networks. The fiber-optic links may be used to carry optical data signals in a signal band associated with wavelength-division-multiplexing channels.

The optical amplifiers may include optically pumped rare-earth-doped fiber such as erbium-doped fiber or Raman-pumped fiber. Laser diode pumps may be used to optically pump the fiber to produce optical gain for the optical data signals in the signal band. The laser diode pumps may be adjusted in real time to prevent gain transients. An analog pump driver circuit may be used to provide a laser drive current for the laser diodes pumps. The analog pump driver circuit may be controlled by a digital-to-analog converter.

Optical taps and monitors may be used to measure the power of the optical data signals at appropriate locations along the main fiber path through the amplifier. Analog-to-digital converter circuitry may be used to digitize the measured power information.

A control unit may be used to control the operation of the optical amplifier. The control unit may store information on the operation of the amplifier such as the digital information used to control the digital-to-analog converters that are used to drive the pumps and the digital information from the optical monitor analog-to-digital converters. The control unit may also gather and store digital information from other sources within the amplifier. As the control unit processes digital information during operation of the amplifier, processed digital data is generated. This processed digital data may also be stored by the control unit.

The information that is stored by the control unit may be used during troubleshooting operations and during operations in which the optical amplifier or other network equipment is being set up or serviced.

Digital information may be collected on-demand by a user (e.g., in response to a digital data capture command) or when certain trigger criteria are satisfied. The user may be provided with an opportunity to establish desired trigger criteria and to otherwise customize the data capture process.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
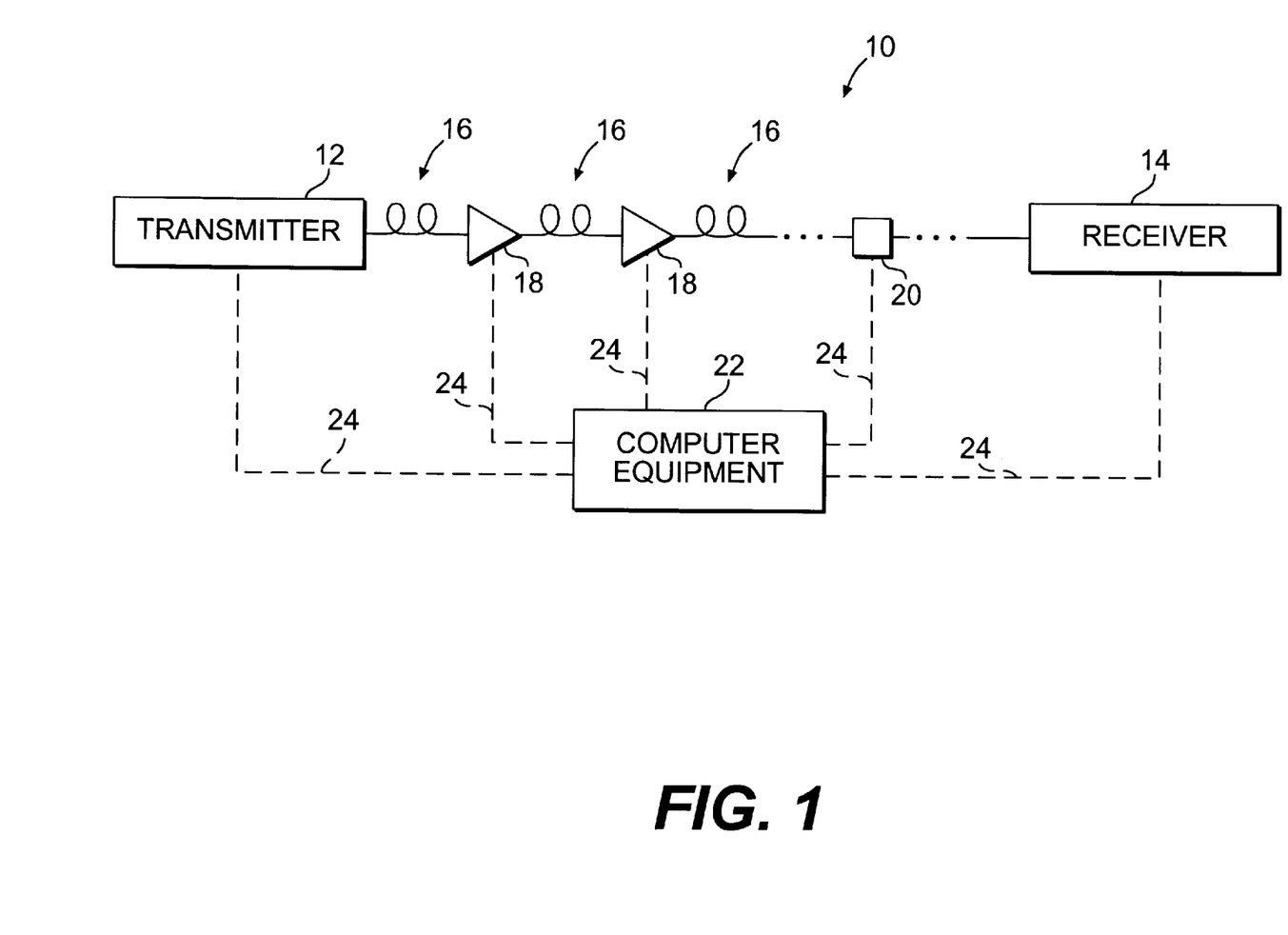
FIG. 1 is a schematic diagram of an illustrative fiber-optic communications link in accordance with the present invention.

An illustrative fiber-optic communications link 10 in an optical communications network in accordance with the present invention is shown in FIG. 1. A transmitter 12 may transmit information to a receiver 14 over a series of fiber links. Each fiber link may include a span 16 of optical transmission fiber. Fiber spans 16 may be on the order of 40–160 km in length for long-haul networks or may be any other suitable length for use in signal transmission in an optical communications network. Link 10 may be a point-to-point link, part of a fiber ring network, part of a network with a star or mesh topology, or part of any other suitable network or system.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely illustrative system characteristics. If desired, fewer channels may be provided, more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., individual wavelengths or sets of wavelengths in the range of 1240–1670 nm).

Optical amplifiers 18 may be used to amplify optical signals on link 10. Optical amplifiers 18 may include booster amplifiers, in-line amplifiers, and preamplifiers. Optical amplifiers 18 may be rare-earth-doped fiber amplifiers such as erbium-doped fiber amplifiers, distributed or discrete Raman amplifiers, semiconductor optical amplifiers, or amplifiers based on any suitable combinations of such amplifiers. For clarity, the present invention will often be described in the context of erbium-doped fiber amplifiers. This is, however, merely illustrative.

Link 10 may include optical network equipment such as transmitter 12, receiver 14, and amplifiers 18 and other optical network equipment 20 such as dispersion compensation modules, dynamic filter modules, add/drop multiplexers, optical channel monitor modules, Raman pump modules, optical switches, etc. For clarity, aspects of the present invention will be described primarily in the context of optical network equipment 20 such as optical amplifiers 18. This is, however, merely illustrative. The features of the present invention may be used with any suitable optical network equipment if desired.

Computer equipment 22 may be used to implement a network management system. Computer equipment such as computer equipment 22 may include one or more computers or controllers and may be located at network nodes and one or more network management facilities. As indicated by lines 24, the network management system may communicate with optical amplifiers 18, transmitter 12, receiver 14 and other optical network equipment 20 using suitable communications paths. The communications paths may be based on any suitable optical or electrical paths. For example, communications paths 24 may include service or telemetry channel paths implemented using spans 16, may include wired or wireless communications paths, may involve communications paths formed by slowly modulating the normal data channels on link 10 at small modulation depths, etc. Paths 24 may also be used for direct communications between amplifiers 18 and other optical network equipment.

Computer equipment 22 may issue commands to amplifiers 18, transmitters 12, receivers 14, and other equipment 20 that direct this equipment to make appropriate adjustments. The adjustments may be used to optimize the gain or signal spectrum flatness along link 10, may be used to optimize the end-to-end or node-to-node signal-to-noise ratio across the signal band or spectrum, or may be used to implement any other suitable control or optimization functions for link 10.

In a typical wavelength-division-multiplexing configuration, multiple optical data channels are carried over a link such as link 10. Each channel has an associated wavelength. Due to an intentional system reconfiguration or an accidental fiber cut, a number of the channels (e.g., 20 out of 40 total channels) may be abruptly dropped. Channels may also be added (e.g., due to a system reconfiguration). In a typical network, any number of channels may be added or dropped.

Figure 2:
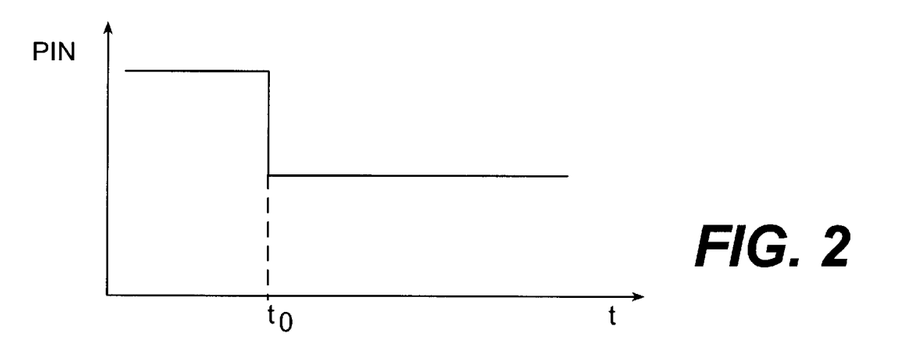
FIG. 2 is a graph showing how the total input power of the optical signals provided to an amplifier may change suddenly when channels are dropped and added.
Figure 3:
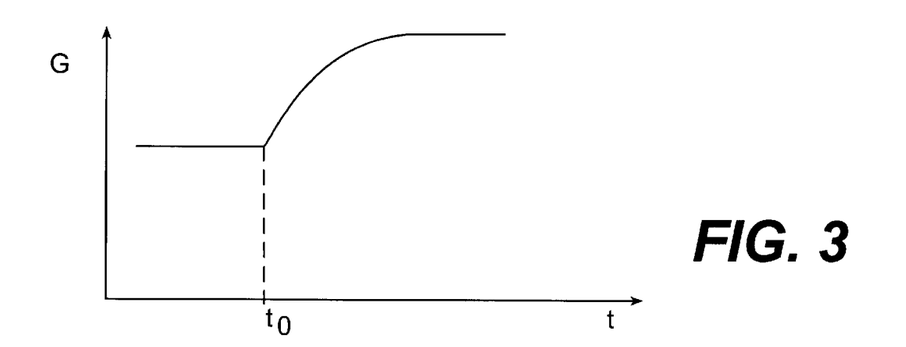
FIG. 3 is a graph showing how the gain in an amplifier without transient control capabilities experiences significant transient effects when the input power to the amplifier fluctuates as shown in FIG. 2.

If the total number of channels being provided at the input to a given amplifier drops in half, the total input power for the amplifier may also drop in half (or some other amount based on the channel powers), as shown at time $t_0$ in FIG. 2. This type of input power fluctuation will cause transients in the gain of the amplifier if the amplifier does not have transient control capabilities. In particular, because the signal loading is suddenly less than the previous steady-state value, the gain of the amplifier will rise suddenly at time $t_0$ as shown in FIG. 3, if the amplifier gain is not controlled. In an erbium-doped fiber amplifier, for example, the gain will rise with a time constant on the order of microseconds due to a rise in the inversion level of the erbium-doped fiber in the amplifier. The remaining channels in the system will experience the increased gain. As a result, the output powers of these channels from the amplifier will track the curve shown in FIG. 3 and will be too high.

Figure 4:
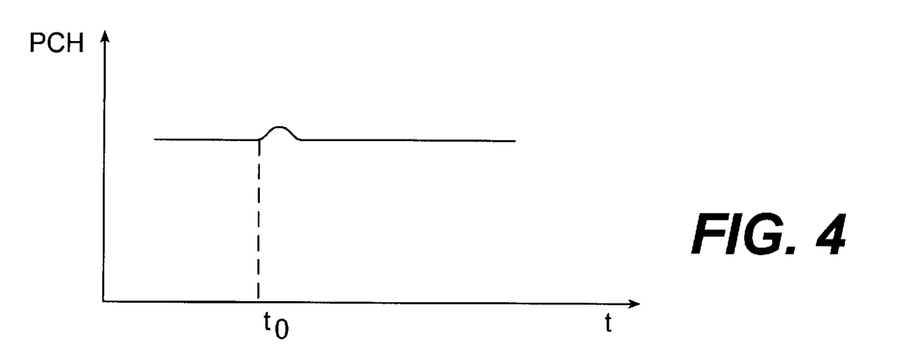
FIG. 4 is a graph showing how gain transients may be suppressed in an amplifier with transient control capabilities in accordance with the present invention.

Amplifiers 18 may be provided with transient control arrangements that ensure that the gain of a given amplifier will not vary significantly, even if the input power to the amplifier fluctuates abruptly. The response of an illustrative amplifier 18 with transient control capabilities is shown in FIG. 4. As shown in FIG. 4, although the input power changes abruptly at time $t_0$ (FIG. 2), the output power per channel $P_{CH}$ does not vary significantly at time $t_0$. Transient control may be provided by using a control unit to adjust the powers of optical pumps in amplifier 18 based on optical power measurements made in amplifier 18.

Figure 5:
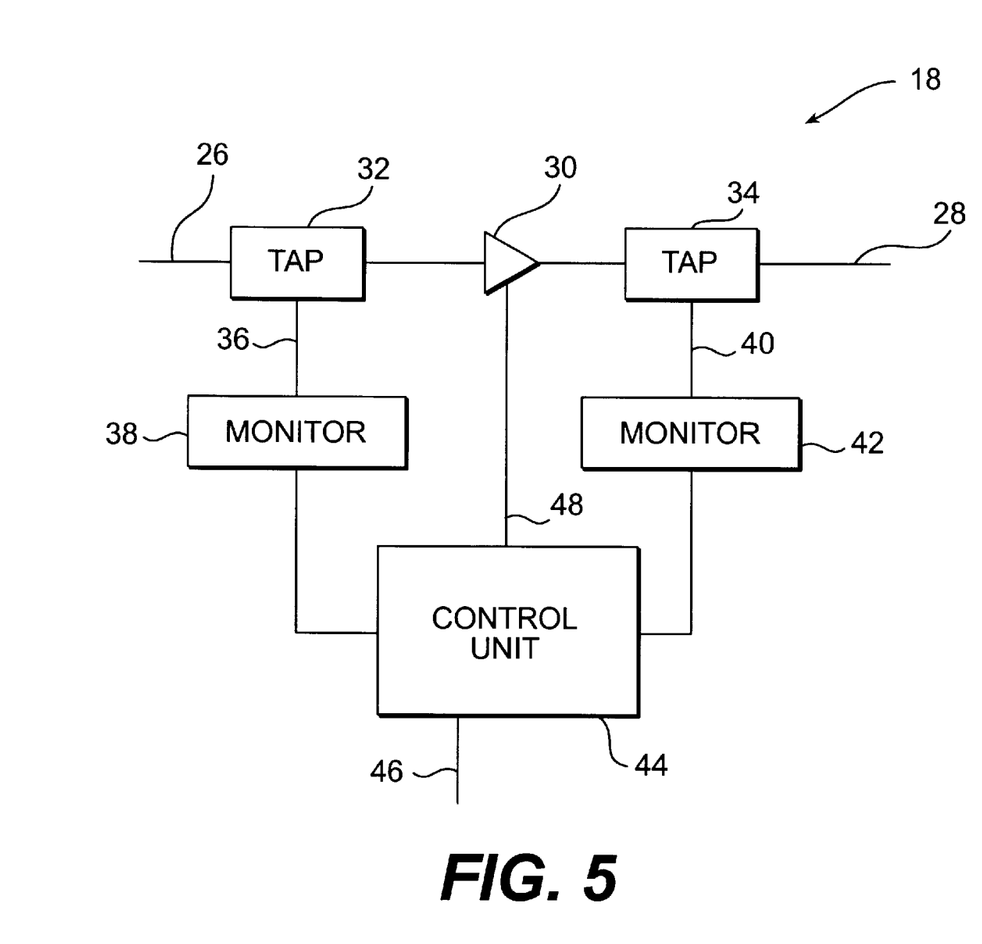
FIG. 5 is a schematic diagram of an illustrative optical amplifier in accordance with the present invention.

An illustrative amplifier 18 with transient control capabilities is shown in FIG. 5. Optical signals from a span of fiber 16 may be provided to input fiber 26. Corresponding amplified output signals may be provided at output fiber 28. Optical gain may be provided by gain stage 30. Gain stage 30 may include two coils of optically-pumped rare-earth-doped fiber such as erbium-doped fiber and other optical components. Laser diode pumps may be used to optically pump the fiber in stage 30.

Taps such as taps 32 and 34 may be used to tap optical signals traveling along the main fiber path through amplifier 18. Taps 32 and 34 may be any suitable optical taps such as 2%/98% wavelength-insensitive taps.

Tap 32 may be used to monitor the total input power to amplifier 18. Tapped signals from input 26 may be provided to fiber 36 by tap 32. Optical monitor 38 may measure the power of the signals provided over fiber 36 from tap 32. Tap 34, fiber 40, and optical monitor 42 may be used to measure the total output power of amplifier 18.

Operation of amplifier 18 may be controlled using control unit 44. Control unit 44 may be based on any suitable control electronics and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc.

Monitors 38 and 42 may be based on any suitable monitoring circuitry. For example, monitors 38 and 42 may include photodetectors that convert light signals into electrical signals and transimpedance amplifiers that convert current signals from the photodetectors into voltage signals for processing by analog or digital circuitry in monitors 38 and 42 or in control unit 44.

By tapping the input and output power for amplifier 18, the average gain level of amplifier 18 and stage 30 may be monitored in real time. Control unit 44 may determine the average gain of amplifier 18 in real time by calculating the ratio of the measured total output power of amplifier 18 to the measured total input power to amplifier 18. This allows the control unit 44 to control the pump power for stage 30 in real time to ensure that the gain of stage 30 and amplifier 18 remains constant at a desired gain setting.

If desired, output power measurements may be used in suppressing transients due to input power fluctuations. For example, control unit 44 may monitor the output power from amplifier 18 using tap 34 and monitor 42 and may control the pump power in stages such as stage 30 based on the measured output power. If the number of channels amplified by amplifier 18 remains constant, using control unit 44 to maintain the output power of amplifier 18 at a constant desired level even as the input power level varies will suppress output power fluctuations.

Control unit 44 may control stage 30 based on input power measurements. For example, the pump power for stage 30 may be increased or decreased appropriately as soon as a significant input power fluctuation is detected. This type of feed-forward control scheme may be used with or without using feedback. Feedback control techniques involve measuring the gain or output power of amplifier 18 and adjusting the pump level or other parameter of amplifier 18 in real time to maintain a desired gain or output power level. Such techniques may be used independently or in combination with feed-forward control techniques.

Control unit 44 may communicate with the network management system or other external computer equipment over path 46. Control unit 44 and path 46 may support any suitable communications protocols. For example, control unit 44 and path 46 may be used to support Ethernet protocols or RS-232 protocols.

The network management system may be implemented on computers at network nodes such as the nodes at which transmitter 12 and receiver 14 are located and at network management facilities or other suitable network locations. The network management system may gather information from amplifier 18 such as information on the current gain that is measured using taps 32 and 34 and monitors 38 and 42.

The network management system may be used to send commands to amplifier 18 and other equipment in the network. As an example, the network management system may send commands to amplifier 18 that direct amplifier 18 to establish and maintain a particular gain setting or output power. Commands may be sent to amplifier 18 that place amplifier 18 in different operating modes. For example, amplifier 18 may be placed in a constant gain mode in which the gain of amplifier 18 is automatically held at a constant level, a constant output power mode in which the output power of amplifier 18 is automatically held constant, or a constant current mode in which the drive currents for the pump lasers are automatically held at a constant level.

Control unit 44 may process information from monitors such as monitors 38 and 42 and may produce corresponding pump control signals at output 48. The pump control signals may be used to adjust the laser diode pumps in gain stage 30.

Amplifiers 18 may be C-band amplifiers, L-band amplifiers, or amplifiers that produce optical gain in any other suitable wavelength range. Amplifiers 18 may have any suitable number of erbium-doped fiber coils or other gain elements in gain stage 30. Moreover, any suitable number of gain stages 30 may be used in amplifier 18.

Figure 6:
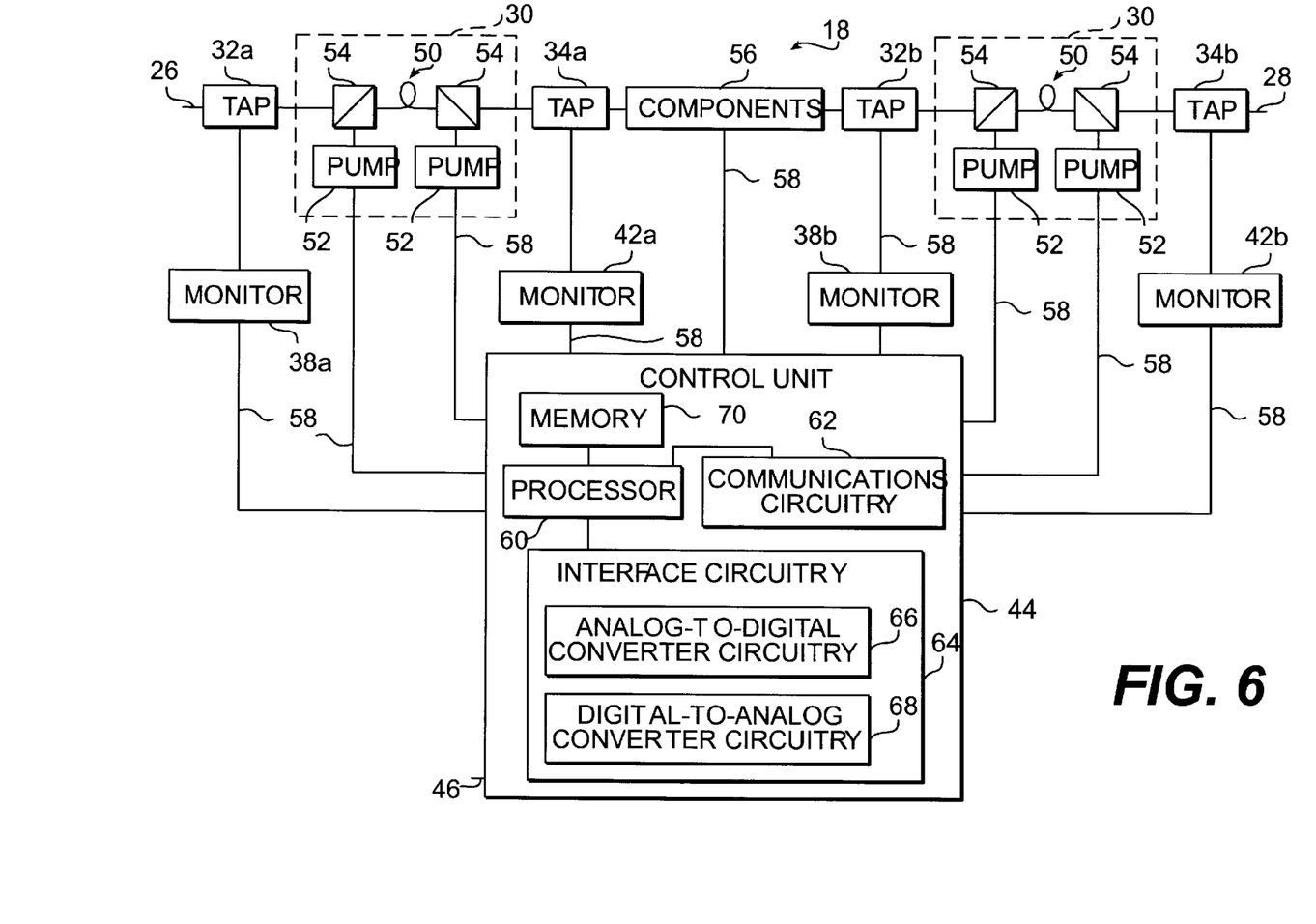
FIG. 6 is a more detailed schematic diagram of an illustrative optical amplifier in accordance with the present invention.

An illustrative amplifier 18 having two gain stages 30 is shown in FIG. 6. Optical data signals traveling along link 10 may be provided as input signals at input fiber 26. The input signals are amplified by coils 50 in stages 30. Corresponding amplified output signals are provided at output fiber 28.

Coils 50 may be formed from lengths of rare-earth-doped fiber such as erbium-doped fiber. Pump light for coils 50 may be provided by pumps 52. Pumps 52 may be based on laser diodes, fiber lasers, or other suitable sources of pump light. Pump light from pumps 52 may be coupled into fiber coils 50 using wavelength-division-multiplexing couplers 54 or other suitable pump couplers. The gain stages shown in FIG. 6 are pumped using both copumping and counter-pumping arrangements. This is merely illustrative. Any suitable pumping arrangement (e.g., only copumped or only counterpumped) may be used if desired.

Control unit 44 may receive information on tapped signal powers using taps 32*a*, 34*a*, 32*b*, and 34*b* and optical monitors such as monitors 38*a*, 38*b*, 42*a*, and 42*b*, may control pumps 52, and may control other suitable components such as components 56. Components 56 may include isolators, taps, circulators, switches, attenuators (e.g., variable optical attenuators), dynamic and static filters, dispersion compensation elements, add/drop multiplexing elements, couplers, or any other suitable elements. Components 56 may be used in the main fiber path of amplifier 18 at any suitable locations between input 26 and output 28. Paths 58 may be used to electrically connect control unit 44 to these components in amplifier 18.

Control unit 44 may have one or more processors or processing circuitry such as processor 60. Processor 60 may be based on microprocessors, digital signal processors, programmable logic devices such as field programmable gate arrays that have been configured to perform processing functions, or other suitable processing circuitry. Communications circuitry 62 may be used to allow processor 60 to communicate over path 46. Interface circuitry 64 such as analog-to-digital converter circuitry 66 and digital-to-analog converter circuitry 68 may be used to provide an interface between processor 60 and the other components of amplifier 18. Memory 70 may be used to store commands the are executed by processor 60 during operation of amplifier 18. Memory 70 may also be used to store data that is gathered by processor 60.

Any suitable data may be gathered during operation of amplifier 18. For example, data may be gathered on the optical signal powers measured by monitors 38a, 42a, 38b, and 42b, information may be gathered on the pump drive currents that are used to drive pumps 52, information may be gathered on the temperatures or other readings from other sensors, and information may be gathered on the control signals that are used to adjust other components. Signals from sensors are typically digitized for processor 60 by analog-to-digital converter circuitry 66.

Other signals may already be in digital form. For example, when processor 60 adjusts the powers of pumps 52, digital pump control signals are generated by processor 60 and converted into analog drive currents using digital-to-analog converter circuitry.

The signals that are digitized by analog-to-digital converter circuitry 62 and the signals that are already in digital form may be stored in memory 70 or in memory in processor 60. As processor 60 performs processing functions during the operation of amplifier 18, these digital signals are converted from raw data into processed data. The processed data may also be stored in memory 70 or in memory within processor 60.

Figure 7:
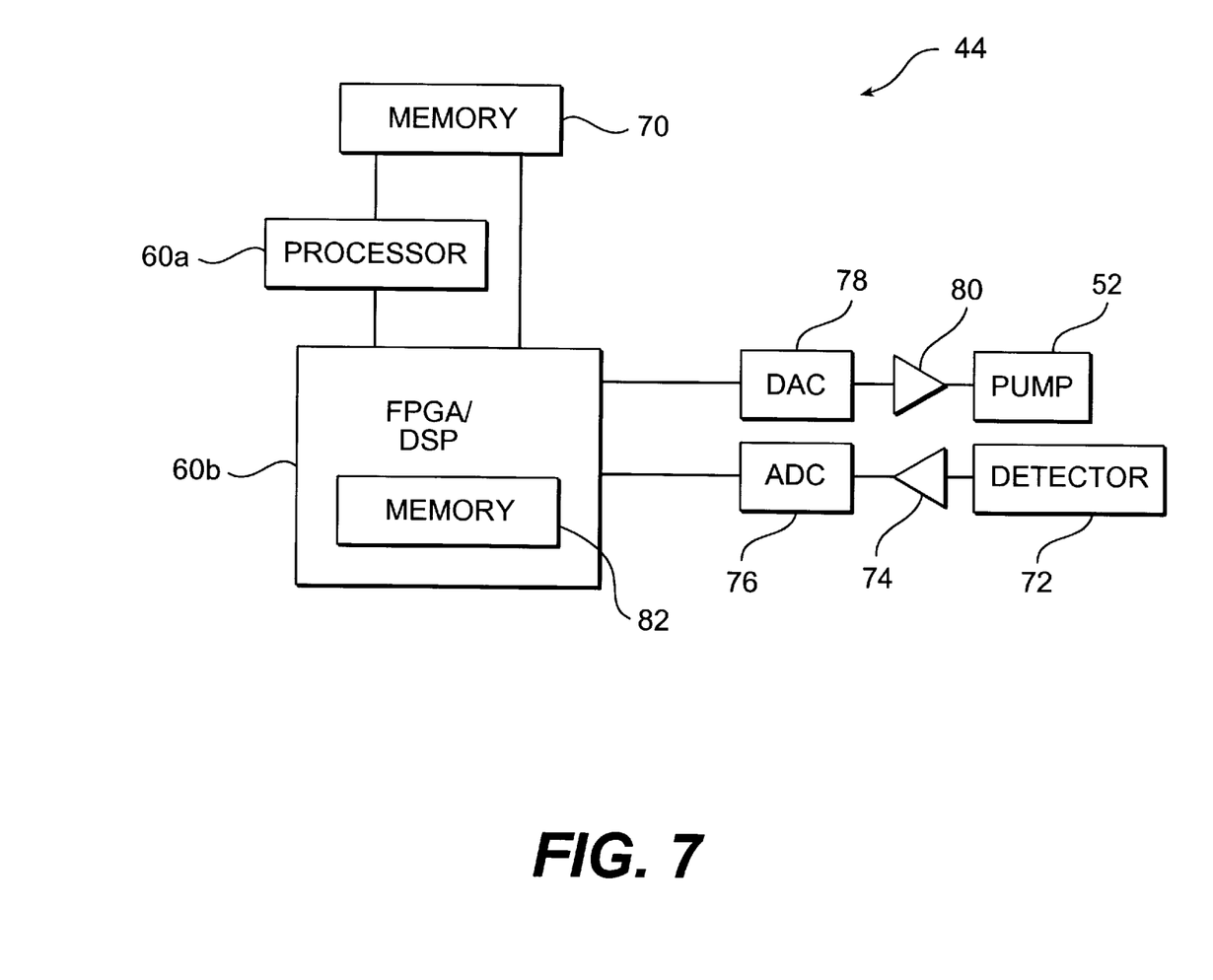
FIG. 7 is a schematic diagram of illustrative optical amplifier control unit circuitry that may be used in gathering and storing data in accordance with the present invention.

A portion of an illustrative control unit 44 in an optical amplifier 18 is shown in FIG. 7. Processor 60a (e.g., a microprocessor, digital signal processor, programmable logic device, etc.) may be used for relatively slower processing functions and processor 60b (e.g., a microprocessor, digital signal processor, programmable logic device, etc.) may be used for relatively faster processing functions.

As an example, processor 60b may be used to implement real time control loops that read optical data signal powers using taps and optical monitors such as detector 72. The current signals from detector 72 may be converted into analog voltage signals using transimpedance amplifier 74. Analog-to-digital converter 76 may be used to convert the analog voltage signals from amplifier 74 into digital data for processor 60b. Processor 60b may process the digital data from detectors such as detector 72 and may issue corresponding digital pump power control commands for digital-to-analog converter 78. Digital-to-analog converter 78 may convert this digital data into an analog control signal that is strengthened by driver 80. The output of driver 80 may be used to drive pump 52.

The digital data from sensors such as detector 72 and the digital data for adjusting components such as pump 52 may be stored in memory 70 or in memory 82 in processor 60b. During the measurement and control operations performed by processor 60b and 60a, processed data may be generated based on the digital sensor and component data. This processed data may also be stored in memory 82 and memory 70 if desired.

Processor 60a may also receive sensor data. For example, processor 60a may receive temperature data from temperature sensors. Processor 60a may also issue digital commands. The raw and processed data handled by processor 60a may also be stored in memory 70 or memory 82 if desired.

With an arrangement of the type shown in FIG. 6 or 7, amplifier data may, be gathered from any suitable sensor or relating to the control or operation of any suitable component in amplifier 18. This allows the performance of amplifier 18 to be monitored during transient events such as those described in connection with FIGS. 2–4.

Figure 8:
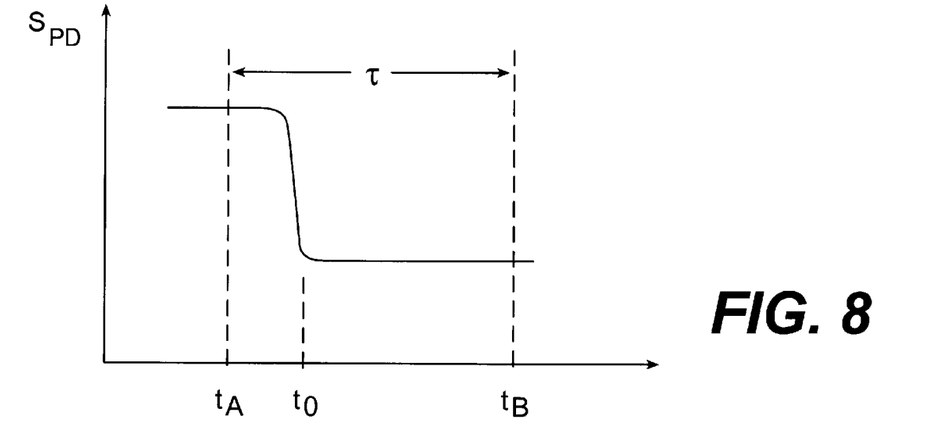
FIG. 8 is a graph showing how an optical monitor measurement may be made during a transient event in accordance with the present invention.

As shown in FIG. 8, for example, control unit 44 may monitor and store information on a photodiode measurement made using an optical monitor. In the example of FIG. 8, there is an input power transient of the type shown in FIG. 2 at time $t_0$. A circular buffer, a linear buffer, or other suitable data structure may be used to capture the data associated with the monitored photodiode signal $S_{PD}$. The photodiode in this example is an input photodiode such as a photodiode in monitor 38a.

Data such as the data of FIG. 8 may be gathered automatically when control unit 44 determines that certain trigger criteria have been satisfied or when a command is received by control unit 44. Commands may be received from the network management system or from other equipment outside of the amplifier that is connected to control unit 44 such as a computer connected to control unit 44 through an RS-232 port.

Any suitable trigger criteria may be established for amplifier 18. For example, a data capture event may be initiated when a given measured photodiode signal (e.g., an input photodiode signal) changes by more than a threshold amount, when the rising edge of the measured photodiode signal passes a given threshold, or when the falling edge of the measured photodiode signal passes a given threshold. If data for a given sensor is being stored continuously in a circular buffer, information that was recorded just before the trigger criteria were satisfied may be saved with the other data. In the graph of FIG. 8, for example, data at times between $t_A$ and $t_0$ may be saved, even though $t_A$ is before $t_0$. Data is also typically saved after the trigger criteria have been satisfied. In the graph of FIG. 8 this is shown by the photodiode data between time $t_0$ (when the trigger criteria were satisfied) and time $t_B$ (when the allocated storage capacity for this event has been reached).

The amount of storage that may be allocated to each event depends on the capacity of memory 70 and 82 and depends on how accurately the data is to be recorded. As an example, a data capture time τ of 4 ms may be used. With this arrangement, 4 ms of data may be captured at a data rate of approximately 1 data byte per 100 ns clock cycle (as an example). Longer storage times may be provided by storing data only every other cycle (e.g., 1 data byte per each two 100 ns clock cycles) or by storing data even less frequently. Other clock cycle times and storage frequencies may be used if desired. More memory may also be allocated to storing data if desired.

Figure 9:
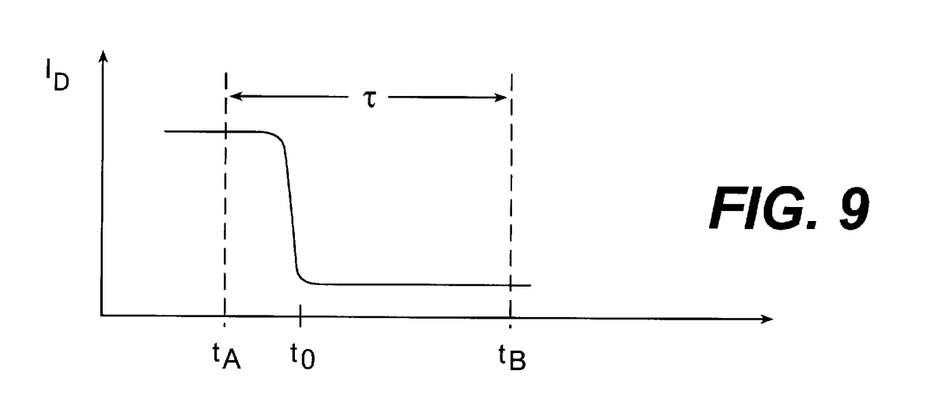
FIG. 9 is a graph showing how a laser drive current measurement may be made during a transient event in accordance with the present invention.

The graph of FIG. 9 shows how digital data relating to the pump drive current may be stored in memory 82 or 70. In the example of FIG. 9, data has been captured from time $t_A$ to time $t_B$. Because the data that was stored covers the operation of a pump 52 during a transient event, the data of FIG. 9 may be used in evaluating the performance of amplifier 18 in controlling pump powers during transients.

Processed data that may be stored includes, as an example, calculated real-time optical gain values for gain stages 30. The ratio of the optical power measured by monitor 42a to that measured by monitor 38a may be used to determine the gain of the first gain stage 30 of FIG. 6. The ratio of the optical power measured by monitor 42b to that measured by monitor 38b may be used to determine the gain of the second gain-stage 30 of FIG. 6. There may be non-negligible delay times associated with fiber coils 50. Control unit 44 may take these optical delay times into account when calculating the gain of the gain stages 30.

Figure 10:
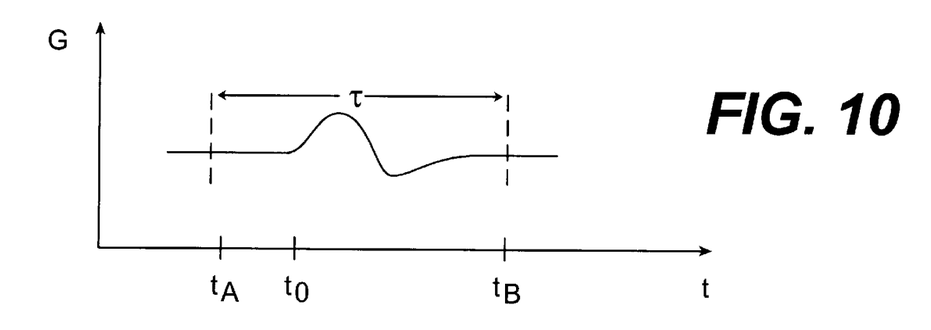
FIG. 10 is a graph showing how the gain of an optical amplifier may be measured during a transient event in accordance with the present invention.

An illustrative gain data curve that may be produced by calculating the ratios of the measured signal powers with control unit 44 is shown in the graph of FIG. 10. Processed data such as the gain data of FIG. 10 may be stored in memory 70 or 82. Such processed data may be stored at the same time that raw data is stored or may be stored instead of storing raw data.

If desired, the types of raw and processed data that are to be stored by the amplifier may be selected by the user. For example, if the user is primarily interested in the performance of the first stage in an amplifier, the user may choose to store data for only the first stage. If the user is primarily interested in the values of tapped optical signals, the user may choose not to record pump drive current data. By choosing to record only a subset of the available data, the duration of the data that is stored can be increased.

Some functions that are implemented by control unit 44 such as photodiode measurement functions and laser diode pump control functions may use a relatively fast processor such as processor 60b. Particularly in these situations, it may be desirable to store raw and processed data in memory 82 within the fast processor 60b, because such memory may be better able to handle the relatively fast processing speeds associated with processor 60b.

Figure 11:
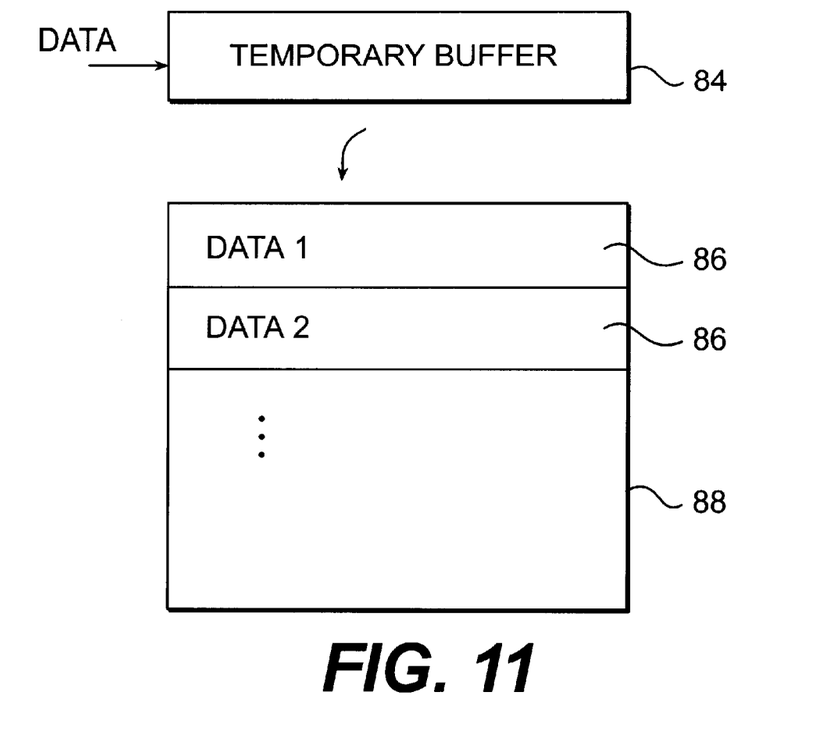
FIG. 11 is a schematic diagram showing how data may be stored in a temporary buffer and then transferred to another memory location in accordance with the present invention.

As shown in FIG. 11, data may initially be stored in a temporary buffer or memory region 84. Buffer 84 may be implemented in memory 82. Later, after trigger criteria have been satisfied or when an appropriate command has been received by control unit 44, the data in buffer 84 may be saved by transferring all or some of this data into a data storage region such as one of data storage regions 86 in memory region 88. Memory region 88 may be implemented in memory 70, memory 82, or a combination of memory 70 and memory 82.

Figure 12:
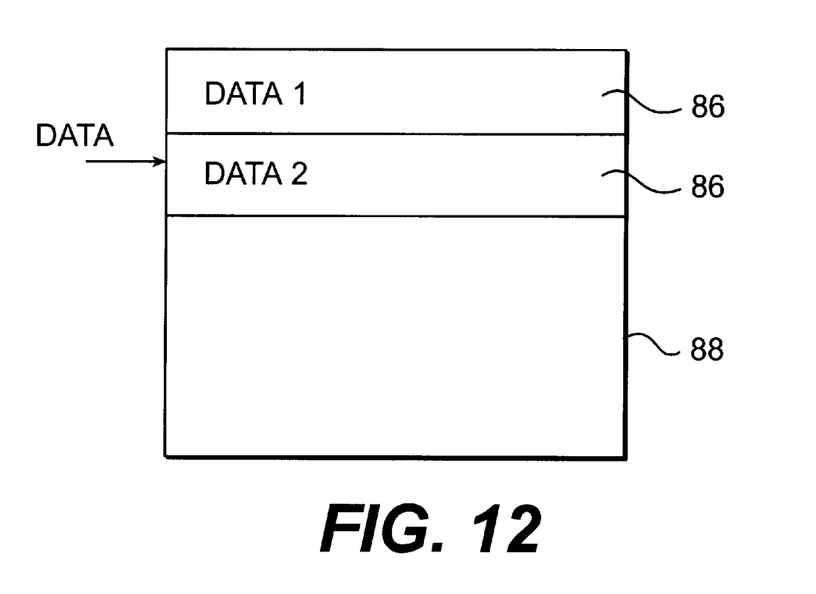
FIG. 12 is a schematic diagram showing how data may be store directly in different memory locations in accordance with the present invention.

Another suitable approach is shown in FIG. 12. With this approach, data may be stored directly in a desired data storage region 86 in memory region 88. Memory region 88 may be implemented in memory 70, memory 82, or a combination of memory 70 and memory 82.

The examples of FIGS. 11 and 12 are merely illustrative. Any suitable technique may be used for storing raw and processed data in any suitable memory in control unit 44 if desired. Single event storage and multiple event storage may be supported.

Figure 13:
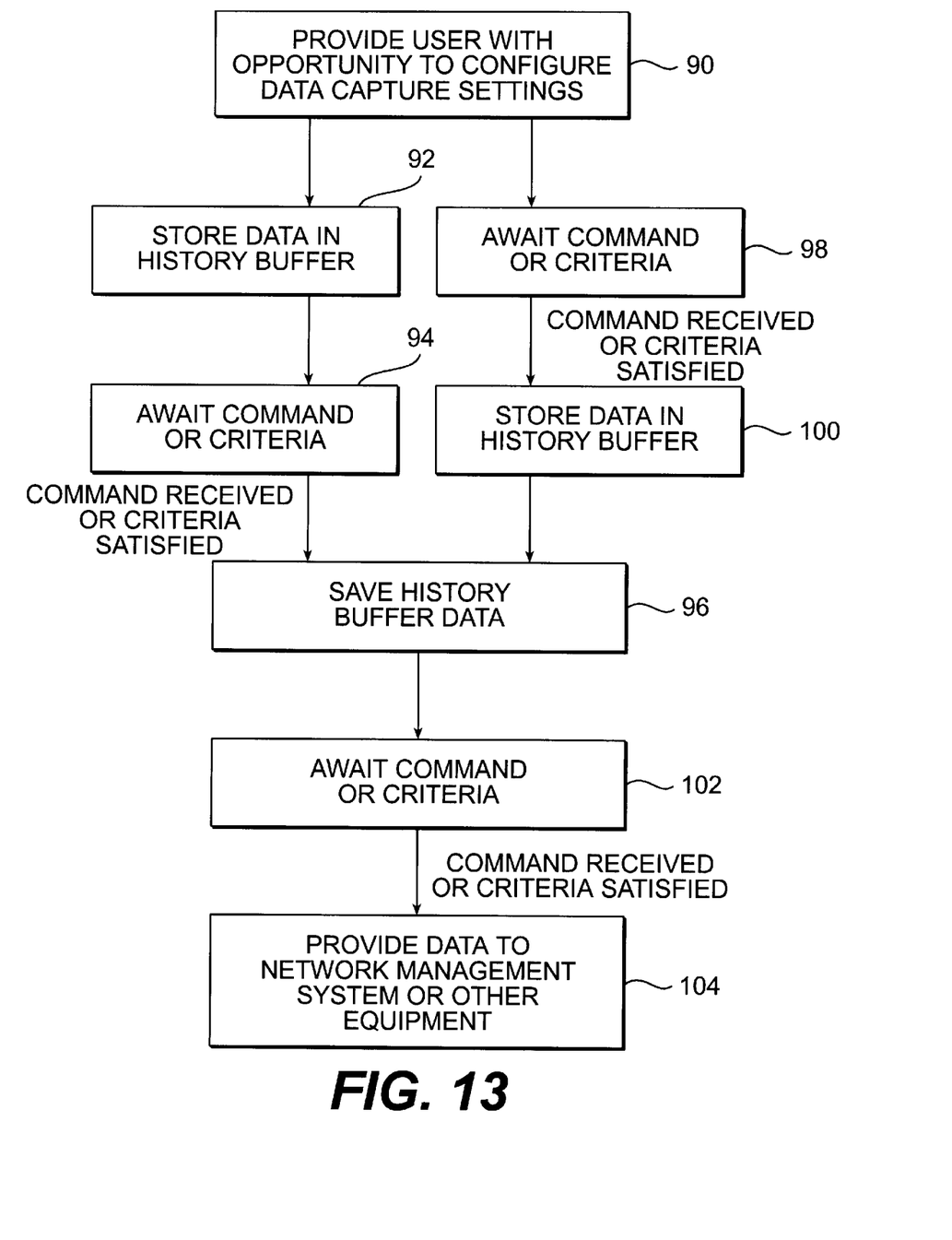
FIG. 13 is a flow chart of illustrative steps involved in gathering data in an optical amplifier or other optical network equipment in accordance with the present invention.

Illustrative steps involved in using control unit 44 to store raw and processed data in amplifier 18 (or other network equipment 20) are shown in FIG. 13. At step 90, a user may be provided with an opportunity to configure data capture settings for amplifier 18. For example, the network management system, a stand-alone computer, or other equipment may be connected to amplifier 18 through path 46. A stand-alone computer may, for example, be connected to amplifier 18 using an RS-232 link or other suitable link.

The user may be personnel using the network management system, field personnel performing maintenance or troubleshooting or setup functions for the amplifier 18 in the field, or personnel associated with a manufacturer or other party. The user may select options that are presented to the user with the network management system or stand-alone computer.

The options may allow the user to set up trigger thresholds. For example, the options may allow the user to configure the amplifier to trigger a data storage event when the measured input power to the amplifier changes be more than a predetermined threshold value.

The options may also allow the user to set up trigger criteria that are based on data measurements for multiple parameters. For example, the options may allow the user to configure the-amplifier to trigger a data storage event when the measured laser drive current for a particular laser diode pump changes by more than a given amount and the measured input power changes by more than a given amount. Trigger criteria may also be set up based on processed data or based on certain times being reached on an internal clock. This allows trigger criteria to be used to establish a data capture schedule (e.g., once per day). If desired, events may be captured based on suitable combinations of these criteria. The user may also customize or select which types of data are captured. As an example, the user may determine that pump drive currents for pump Nos. 2 and 4 and photodiode signals for photodiodes Nos. 1 and 5 may be measured.

The capture length $\tau$ and the step size (one byte of captured data per clock cycle, one byte per two cycles, etc.) may also be selected by the user. Another user-selectable setting relates to the offset between $t_A$ and $t_0$. If desired, this offset may be large, so that a relatively large amount of data corresponding to activities before the trigger criteria were satisfied may be stored. The offset may also be set to zero, so that only events at and after the trigger criteria are satisfied are stored. Another possibility is to set the offset so that only activities that begin at some time after the trigger criteria are satisfied will be stored.

These are merely illustrative examples. Any suitable functions related to the data storage process may be configured using user-selected parameters if desired. All or some or these settings may also be configured as factory defaults during the manufacturing process.

Data may be captured at least two different ways, as shown by the left and right branches in the flow chart of FIG. 13. With one approach (shown in the left branch), data may be continuously captured and placed in a buffer or other memory structure at step 92. A circular buffer or other suitable data structure may be used during data capture, so that there is always some data for recent past activities stored in the buffer. The memory region in which the data is stored may be referred to as a history buffer. At step 94, control unit 44 may wait until it is time to more permanently capture the data in the history buffer.

The control unit may receive a data storage trigger command from the user from outside the amplifier to capture the data or the factory-set or user-selected trigger criteria may be satisfied. The data storage trigger command may be a dedicated data storage command that is only used or is primarily used for directing the amplifier to perform a data storage operation. The data storage trigger command may also serve to direct the amplifier to perform other functions in addition to data storage. For example, data storage may be triggered when a "gain control on" command is received by the amplifier. When this command is received, data storage may be triggered and the automatic gain control functions of the amplifier may be turned on. If desired, the user may specify which commands trigger data storage events by the amplifier.

When the trigger criteria have been satisfied or when a command has been received that directs the amplifier to store data, the appropriate data may be saved (after the entire event has been captured) by transferring the history buffer data into another memory region at step 96 (as shown in FIG. 11).

With another approach (shown in the right branch), control unit 44 may initially wait at step 98 until it is time to store data. When an appropriate data storage trigger command is received from outside the amplifier or when the factory-set or user-selected trigger criteria established at step 90 have been satisfied, the appropriate amplifier data may be captured in the history buffer at step 100. If desired, the history buffer data that was captured at step 100 may be transferred to another storage location at step 96.

Steps 92, 94, 96, 98, and 100 are merely illustrative. Any suitable techniques may be used to store the processed and raw data if desired. Moreover, these steps may be repeated multiple times to capture data for multiple events if desired.

At step 102, control unit 44 may wait until it is time to download the stored data. The data may be downloaded using path 46. The download process may be initiated by a command from the user (e.g., a command received over path 46 from a network management system or over a RS-232 link or other suitable path 46 from a user at a stand-alone computer or other equipment). The download process may also be initiated when certain trigger criteria are satisfied (e.g., a certain time has been reached, the memory is full, a transient event has been detected, thresholds have been exceeded, etc.).

At step 104, the stored data may be provided to the user. The stored data may be provided to the user over path 46. If the user is located at the network management system, the stored data may be transmitted to the network management system. If the user is located at a stand-alone computer (e.g., a personal computer), the stored data may be transmitted to the stand-alone computer (e.g., over an RS-232 line or other suitable path 46). The user may use the data for debugging or troubleshooting, for performing tasks related to network maintenance, or for setup procedures.

Although some of the features of the present invention have been described in the context of optical amplifiers 18, this is merely illustrative. The features of the present invention may be used in any suitable optical network equipment 20 if desired.

It will be understood that the foregoing is merely illustrative of the principles of this invention, and that various modifications can be made by those skilled in the art without departing from the scope and spirit of the invention.

What is claimed is:

1. An optical amplifier that amplifies optical data signals in a signal band in a fiber-optic communications link, comprising:

at least one gain stage that provides optical gain that amplifies the optical data signals; and a control unit that controls the gain stage and that includes memory in which amplifier data is stored, wherein the amplifier data includes sensor data, and wherein the control unit is configured to save at least some of the amplifier data when the control unit determines that certain data storage trigger criteria have been satisfied, wherein the data storage trigger criteria include at least some user-selected data storage trigger criteria, and wherein at least some of the data storage criteria are based on a measured sensor signal.

2. The optical amplifier defined in claim 1 wherein the control unit saves certain user-selected types of amplifier data when the trigger criteria are satisfied.

3. The optical amplifier defined in claim 1 wherein the data storage trigger criteria include user-selected threshold levels.

4. The optical amplifier defined in claim 1 wherein the control unit is configured to store at least some of the amplifier data in a circular buffer.

5. The optical amplifier defined in claim wherein the data storage trigger criteria include criteria based on at least two types of amplifier data.

6. The optical amplifier defined in claim 1 wherein the control unit includes a relatively slower processor and a relatively faster processor, and wherein at least some of the amplifier data is stored in memory in the relatively faster processor.

7. The optical amplifier defined in claim 1 wherein the control unit includes a relatively slower processor and a relatively faster processor, wherein at least some of the amplifier data is stored in memory in the relatively faster processor, and wherein the control unit is configured to transfer stored data from the memory in the relatively faster processor to memory that is external to the relatively faster processor.

* * * * *